United States Patent [19]
Gillet

[11] 3,821,568
[45] June 28, 1974

[54] ROTOR POLES FOR CRYO-ALTERNATORS
[75] Inventor: Roger Gillet, Belfort, France
[73] Assignee: Societe Generale de Constructions Electriques et Mecaniques (Alsthom), Paris, France
[22] Filed: July 10, 1972
[21] Appl. No.: 270,037

[52] U.S. Cl.................. 310/54, 310/61, 310/214
[51] Int. Cl. ............................................ H02k 1/32
[58] Field of Search............ 310/10, 40, 52, 54–64, 310/214

[56] References Cited
UNITED STATES PATENTS
| | | | |
|---|---|---|---|
| 1,448,700 | 3/1923 | Seidner............................... | 310/54 |
| 2,497,650 | 2/1950 | Anderson........................ | 310/214 X |
| 2,590,255 | 3/1952 | LeTourneau....................... | 310/214 |
| 2,727,161 | 12/1955 | Kilner et al....................... | 310/54 X |
| 3,098,941 | 7/1963 | Willyoung......................... | 310/54 X |
| 3,154,706 | 10/1964 | Richardson et al............... | 310/64 X |
| 3,249,775 | 5/1966 | Baylac.............................. | 310/64 X |
| 3,261,995 | 7/1966 | Kohn................................... | 310/64 |
| 3,471,726 | 10/1969 | Burnier et al..................... | 310/10 X |
| 3,517,231 | 6/1970 | Massar................................ | 310/52 |

Primary Examiner—D. F. Duggan
Attorney, Agent, or Firm—Craig and Antonelli

[57] ABSTRACT

A rotor pole for cryo-alternators, characterized in that the rotor winding is disposed therein within fluid-tight channels consisting of a continuous group of grooves or slots surrounding the axis of the pole, arranged in the rotor and closed off, after installation of the winding, by means of wedges welded to the upper part of the grooves or slots.

11 Claims, 3 Drawing Figures

ROTOR POLES FOR CRYO-ALTERNATORS

The present invention is directed to improvements in the construction of the rotor winding in a cryo-alternator which is maintained at a very low temperature, for example that of liquid helium, liquid hydrogen, or liquid nitrogen.

It is known in the art that the rotors of conventional electrical machines may be cooled by the circulation of liquid in the conductors themselves, or in cooling channels which are disposed between the conductors and in good thermal contact with the latter. However, these known arrangements are ill suited for windings that consist of finely divided conductors, such as is the case in cryo-alternators. Therefore, the present invention proposes a new construction for the rotor poles of cryoalternators.

According to the present invention, the winding of a rotor pole is disposed in fluid-tight channels consisting of a continuous group of grooves or slots surrounding the axis of the pole and arranged in the rotor. The channels are closed off, after installation of the winding, by means of wedges welded in the upper part of the grooves or slots, and this fluid-tight and closed group is connected with the outside by means of perforations on the side or in the bore of the rotor, and a cryogenic fluid flows therethrough.

Preferably, longitudinal channels are disposed between the bottom of the grooves or slots and the winding, and the cryogenic fluid flows therethrough in the inverse direction. These longitudinal channels are interconnected by means of transverse passages arranged in the winding, between the winding and the slot-closing wedge, and between the winding and the slot edges.

One embodiment of the present invention, which is given solely by way of example and is not to be construed limiting manner, will now be further described hereinafter with reference to the accompanying schematic drawing, wherein FIG. 1 is a top plan view of a rotor pole;

Figure 1:
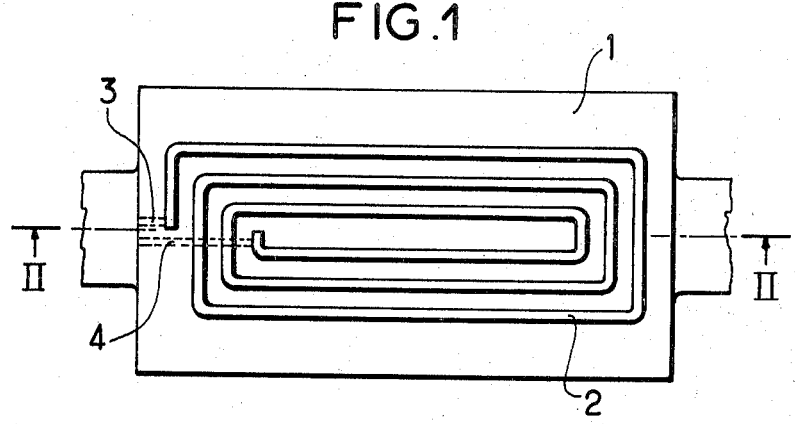
Figure 2:
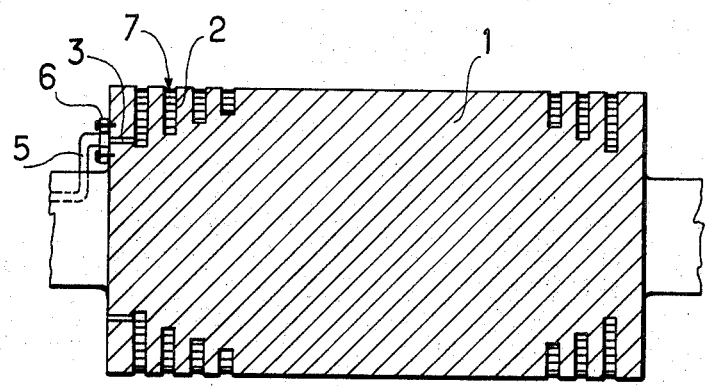
FIG. 2 is a cross-sectional view taken along line II—II of FIG. 1.

FIG. 1 shows a rotor 1 made from stainless steel including a schematically illustrated group of slots 2 serving as a housing for the winding of the rotor pole. These slots extend along a continuous line disposed around the axis of the pole and, in a plane view, appear as a network or coil-like pattern. The connections with the outside are established in the form of perforations 3 and 4 in the rotor 1. These perforations open into conduits, such as the conduit 5 of FIG. 2, being secured to the rotor 1 by means of clamps or brackets, such as the clamp 6. The slots 2 are closed off at the upper part thereof with wedges 7 which are welded at 8 onto the walls of the slots 2, as is apparent from FIG. 3.

Figure 3:
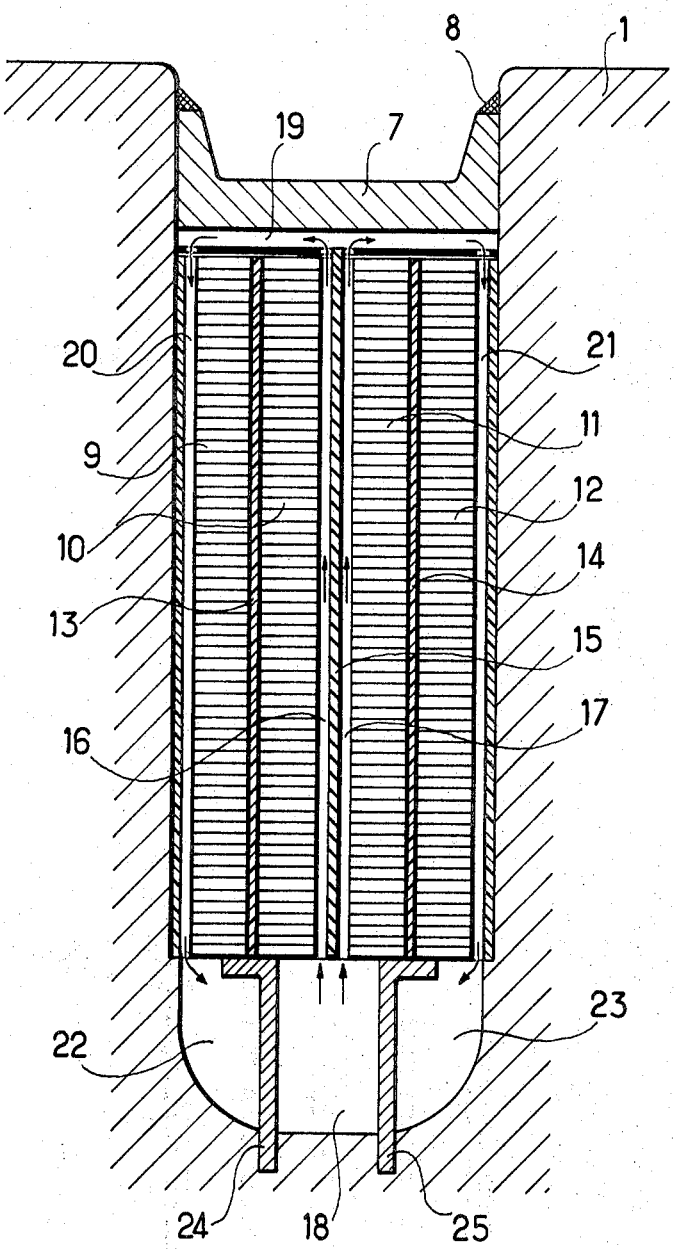
FIG. 3 is a cross-sectional view, at an enlarged scale, of a rotor slot.

FIG. 3 shows the inside of a slot 2. The winding is composed of four columns or stacks 9, 10, 11 and 12 of conductors in the form of bands. The stacks 9 and 10 are separated from each other by an insulation member 13 consisting of epoxy glass, and the stacks 11 and 12 are separated from each other by an analogous insulation member 14. Inserted between the stacks 10 and 11 is an insulating separator 15, also made from epoxy glass, which provides radial channels 16 and 17 connecting a lower chamber 18, serving for the admission of the cryogenic fluid, for example liquid helium, with transverse passage 19 arranged at the top of the slot or notch and from there by means of radial passages 20 and 21 arranged along the walls of the slot, to chambers 22 and 23, serving for the outlet of the cryogenic fluid. The course or path of the cryogenic fluid has been indicated in the figure by arrows. The chamber 18 is separated from chambers 22 and 23 by means of separators 24 and 25, preferably made from stainless steel.

While there have been shown and described but specific embodiments of the invention, it will be understood by those skilled in the art that the invention is not limited thereto or thereby.

What I claim is:

1. A rotor pole for cryo-alternators, comprising a rotor body having formed therein a plurality of continuous fluid-tight channels consisting of a group of slots forming a continuous line surrounding the axis of the rotor body pole, a winding disposed in the fluid-tight channels, and a plurality of wedges welded to the upper part of the slots for closing off the slots in a fluid-tight manner, this fluid-tight closed group of slots being connected to the outside of the rotor body by means of perforations in the bore of the rotor through which a cryogenic fluid flows.

2. A rotor pole for cryo-alternators according to claim 1, wherein said fluid-tight channels include separate longitudinal channels provided between the bottom of the slots and said winding through which the cryogenic fluid flows in opposite directions, and in that said longitudinal channels are interconnected by a plurality of transverse passages arranged through the winding, between the winding and the slot-closing wedge, and between the winding and the slot edges.

3. A rotor pole for cryo-alternators according to claim 1, wherein said group of slots are provided in the form of a network pattern in an axial plane of the rotor body.

4. A rotor pole for cryo-alternators according to claim 1, wherein said winding is formed as a plurality of stacks of band-like conductors disposed in said slots, said stacks of conductors being separated by insulating members.

5. A rotor pole for cryo-alternators according to claim 4, wherein said fluid-tight channels include a plurality of passages for cryogenic fluid disposed between said stacks of conductors from the top to the bottom thereof, an outer chamber adjacent said wedge communicating with each of said passages, and an inner chamber divided into a plurality of longitudinal channels communicating with respective ones of said passages.

6. A rotor pole for cryo-alternators according to claim 5, wherein said group of slots are provided in the form of a network pattern in an axial plane of the rotor body.

7. A rotor pole for cryo-alternators according to claim 5, wherein four stacks of conductors are provided in said slots, said stacks being arranged in first and second pairs on respective sides of a central insulating member, a pair of passages being formed on respective sides of said central insulating member and an additional pair of passages being formed between said respective pairs of stacks and the sides of said slot.

8. A rotor pole for cryo-alternators according to claim 7, wherein said inner chamber is divided into three adjacent longitudinal channels, the outer longitudinal channels communicating with respective ones of said additional pair of passages and the central longitudinal passage communicating with said pair of passages on either side of said central insulating member.

9. A rotor pole for cryo-alternators, comprising a rotor body having formed in the surface thereof a plurality of continuous fluid-tight channels consisting of a continuous group of slots surrounding the axis of the rotor body, wedges fixedly secured to the upper part of the slots for forming the fluid-tight channels within the rotor body, a winding disposed within the fluid-tight channels, and perforations in the rotor body for connecting the fluid-tight closed group of slots to the outside of the rotor body for providing a flow path through which a cryogenic fluid flows.

10. A rotor pole for cryo-alternators according to claim 9, wherein the winding is disposed within the fluid-tight channels so as to provide flow passages for the cryogenic fluid between the bottom of the slots and the winding, between the winding and the slot-closing wedge, and between the winding and the slot edges.

11. A rotor pole for cryo-alternators according to claim 9, wherein said group of slots are provided in the form of a coil-like pattern extending in an axial plane of the rotor body.

* * * * *